United States Patent
Wonus et al.

(10) Patent No.: US 12,393,791 B2
(45) Date of Patent: Aug. 19, 2025

(54) CROSS-ORTHOGRAPHY FUZZY STRING COMPARISONS

(71) Applicant: Microsoft Technology Licensing, LLC, Redmond, WA (US)

(72) Inventors: Kevin Corley Wonus, Haymarket, VA (US); Shane Douglas Solomon, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 476 days.

(21) Appl. No.: 17/745,412

(22) Filed: May 16, 2022

(65) Prior Publication Data

US 2023/0367974 A1  Nov. 16, 2023

(51) Int. Cl.
  *G06F 40/47* (2020.01)
  *G06F 16/2458* (2019.01)

(52) U.S. Cl.
  CPC .......... *G06F 40/47* (2020.01); *G06F 16/2468* (2019.01)

(58) Field of Classification Search
  CPC .... G06F 40/47; G06F 16/2468; G06F 16/279; G06F 40/232; G06F 40/53; G06F 40/129; G06F 16/33; G06F 16/90344; G06F 16/3347; G06F 16/3337; G06F 16/3344
  See application file for complete search history.

(56) References Cited

U.S. PATENT DOCUMENTS

| | | | |
|---|---|---|---|
| 8,543,598 B2 * | 9/2013 | Udupa | G06F 16/30 707/747 |
| 9,934,775 B2 * | 4/2018 | Raitio | G10L 13/0335 |
| 2012/0016663 A1 * | 1/2012 | Gillam | G06F 16/90344 704/9 |
| 2012/0278302 A1 | 11/2012 | Choudhury et al. | |

OTHER PUBLICATIONS

"International Search Report and Written Opinion Issued in PCT Application No. PCT/US23/015608", Mailed Date: Jun. 19, 2023, 14 Pages.
Prabhakar, et al., "Machine Transliteration and Transliterated Text Retrieval: A Survey", In Journal of Sadhana, vol. 43, Issue 6, Jun. 7, 2018, pp. 1-25.

(Continued)

*Primary Examiner* — Bhavesh M Mehta
*Assistant Examiner* — Jangwoen Lee
(74) *Attorney, Agent, or Firm* — Holzer Patel Drennan (57) ABSTRACT

Fuzzy string comparison between a first textual string of a first orthography and a second textual string of a second orthography is provided. The first and second textural strings are transliterated to a first phonetic spelling and a second phonetic spelling, respectively. Application of constraints of the first orthography on the first phonetic spelling and of constraints of the second orthography on the second phonetic spelling is detected. The detected constraints of the first orthography on the first phonetic spelling are reversed to generate a first revised phonetic spelling, and the detected constraints of the second orthography on the second phonetic spelling are reversed to generate a second revised phonetic spelling. The first revised phonetic spelling and the (Continued)

second revised phonetic spelling are compared to generate a similarity score for the first textual string and the second textual string.

20 Claims, 4 Drawing Sheets

(56) References Cited

OTHER PUBLICATIONS

"Top-Ranked Demand Side Platform (DSP) Software—Basis Technologies", Retrieved From: https://basis.net/technology/dsp?utm_source=bing&utm_medium=paidsearch&utm_content=searchad&utm_campaign=brand&utm_term=basis%20technology&msclkid=c53ff73e6d4e1a2c54ae96cc97db6797, Retrieved on: Feb. 18, 2022, 8 Pages.

Dixon, Matthew, "A phonetic matching made in hɛvə n", Retrieved From: https://www.microsoft.com/en-us/research/blog/a-phonetic-matching-made-in%CB%88h%C9%9Bv%C9%99n/, Jun. 6, 2019, 12 Pages.

Tian, Feiyang, "Orthographic Constraints on the Integration of English Loanwords in Mandarin Chinese" In Theory and Practice in Language Studies, vol. 2, No. 5, May 2012, pp. 965-971.

Gestalt Pattern Matching, From Wikipedia, The Free Encyclopedia, Last modified on Jan. 30, 2021, Retrieved from: https://en.wikipedia.org/wiki/Gestalt_Pattern_Matching.

* cited by examiner

CROSS-ORTHOGRAPHY FUZZY STRING COMPARISONS

CROSS-ORTHOGRAPHY FUZZY STRING COMPARISONS

Background

The ability to perform searches of proper names and locations using any language in a query presents many benefits and yet many challenges. In an example, a user submits a Mandarin-language (e.g., Standard Mandarin Language) query to a database containing English-language (e.g., US English Language) documents. The user would benefit greatly if the search tool could transliterate the query between the two languages and perform fuzzy string comparisons to generate accurate search results matching the original query (proper names and locations are seldom translated and are most often transliterated). However, the accuracy of such transliterations and comparisons between different languages can induce inaccuracies. As a result, the user's search of an English-language database using the Mandarin-language query is likely to provide inadequate results without additional processing.

SUMMARY

The described technology provides fuzzy string comparison between a first textual string of a first orthography and a second textual string of a second orthography. The first textual string and the second textual string are transliterated to a first phonetic spelling and a second phonetic spelling, respectively. Application of one or more constraints of the first orthography on the first phonetic spelling and of one or more constraints of the second orthography on the second phonetic spelling is detected. The detected constraints of the first orthography on the first phonetic spelling are reversed to generate a first revised phonetic spelling, and the detected constraints of the second orthography on the second phonetic spelling are reversed to generate a second revised phonetic spelling. The first revised phonetic spelling and the second revised phonetic spelling are compared to generate a similarity score for the first textual string and the second textual string.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

The described technology provides improved comparison between strings of different languages (cross-orthographic comparisons). An orthography is a set of conventions for writing a language, including without limitation norms of spelling, hyphenation, capitalization, word breaks, emphasis, and/or punctuation. Aspects of one or more implementations for the described technology may include:

Comparing phoneme feature vectors rather than individual characters of two strings from different languages Reversing phonological constraints of a language to the transliteration of an input string in that language Applying orthographical constraints of both input string languages to the transliteration of an input string Using the aspects and/or various combinations listed above, the described technology improves the reliability and accuracy of fuzzy-matching of strings across orthographies and across differing transliteration schemes.

Figure 1:
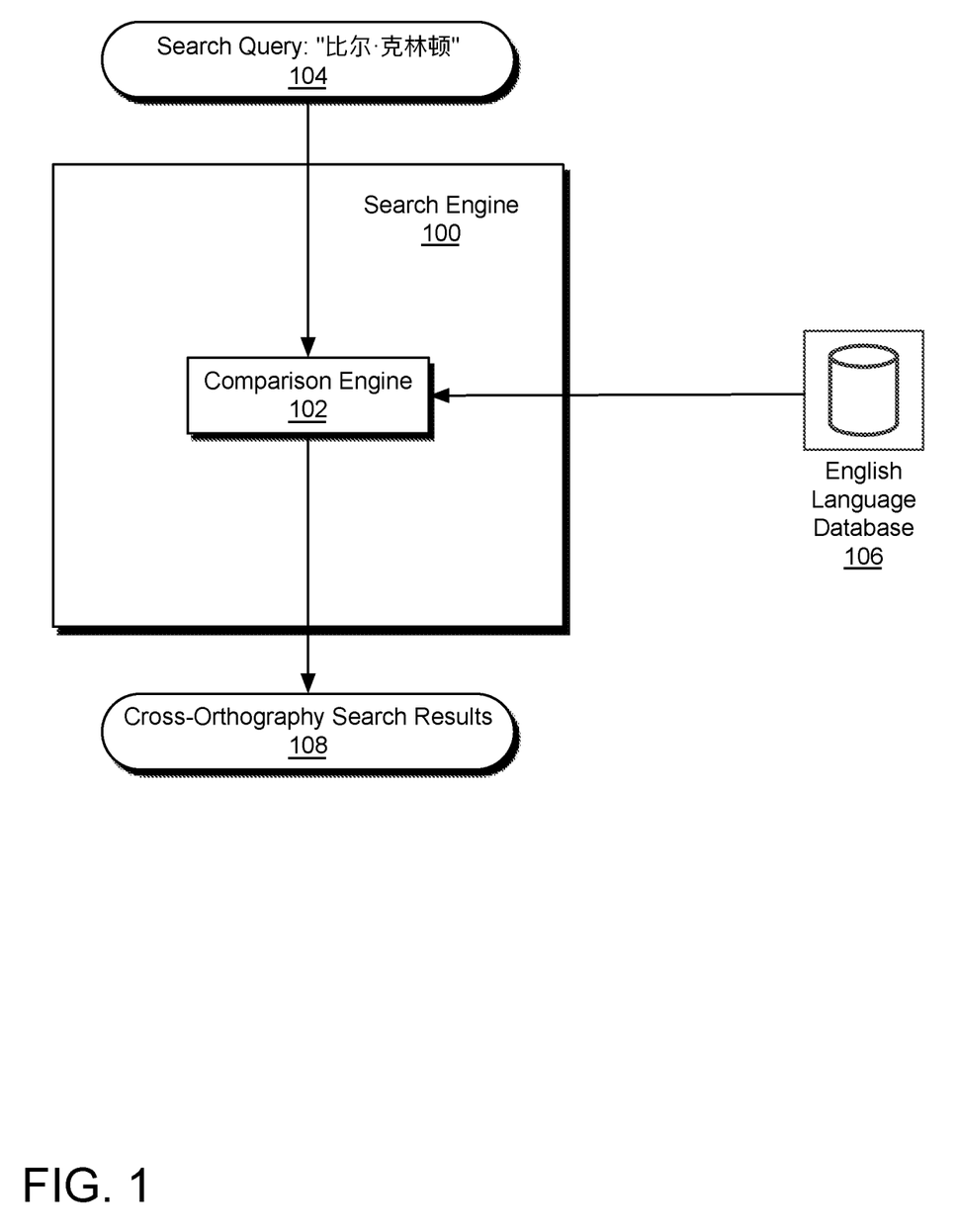
FIG. 1 illustrates a search engine with an example cross-orthography fuzzy string comparison engine.

FIG. 1 illustrates a search engine 100 with an example cross-orthography fuzzy string comparison engine 102. In FIG. 1, a search query 104 (containing the Mandarin text string ""比尔·克林顿"") is input to the search engine 100 for use in searching an English language database 106.

Such a search involves cross-orthographic comparison, a challenging operation that can nevertheless be useful in other applications as well, including without limitation semantic processing, spam filtering, intrusion detection, and text and speech translation between different languages. In the case of a search engine, the cross-orthographic string comparison may be employed to categorize and organize data efficiently during the search. Categorization is accomplished based at least in part on matching the search query keywords to related keywords in the searched data.

In the illustrated search engine 100, the comparison engine 102 performs cross-orthographic fuzzy string comparison using one or more of reversing phonological of a language to a transliterated phonetic string of search query 104 in that language and/or applying orthographical constraints of both languages to each input string and then comparing phoneme feature vectors of processed phonetic spellings the Mandarin language search query 104 and strings in the English language database 106. Based on the scoring of the cross-orthographic string comparisons performed by the comparison engine 102, the search engine 100 outputs the cross-orthographic search results 108 (e.g., a ranked listing of similar strings from the English language database 106).

Figure 2:
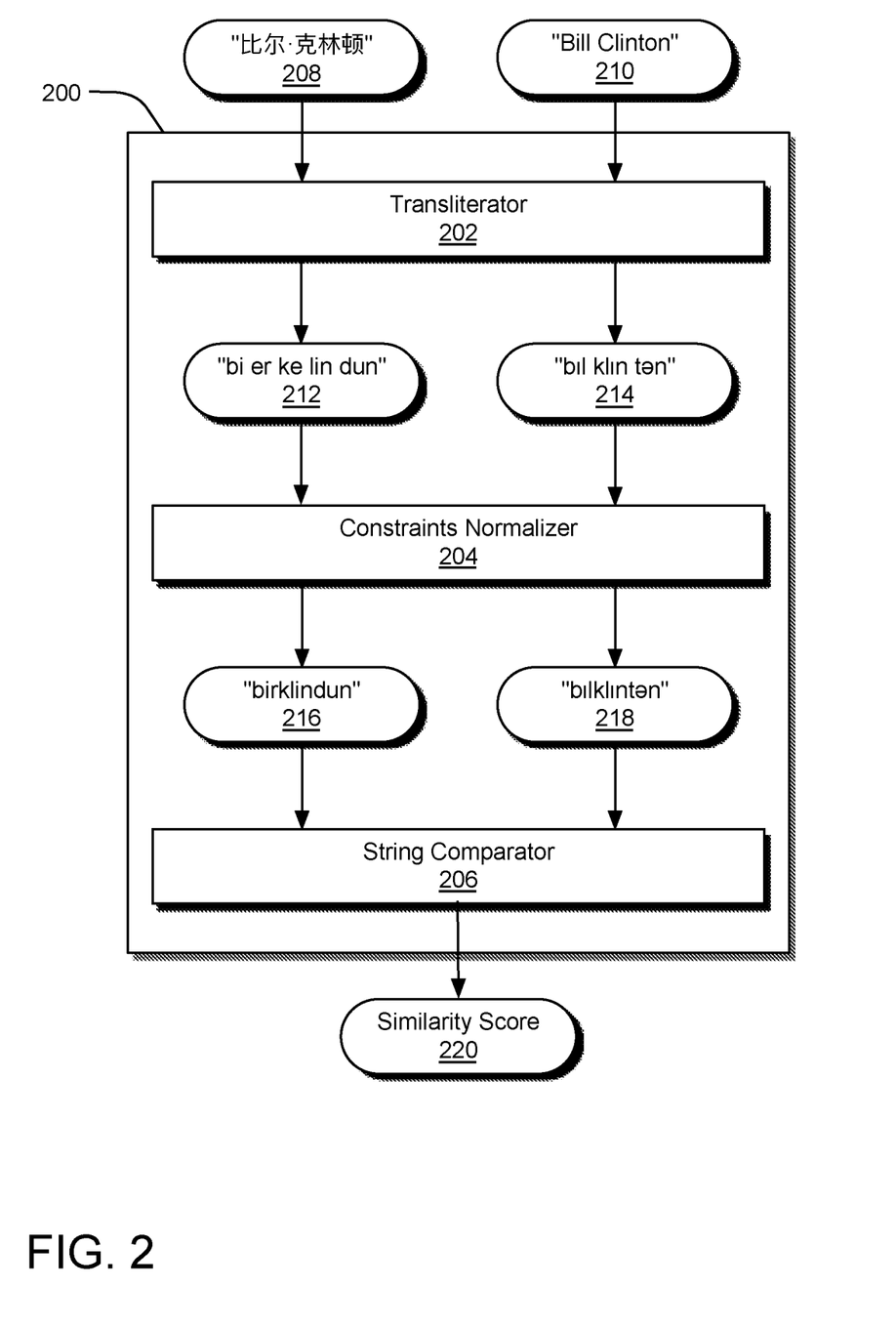
FIG. 2 illustrates an example cross-orthography fuzzy string comparison engine.

FIG. 2 illustrates an example cross-orthography fuzzy string comparison engine (comparison engine 200). The comparison engine 200 includes a transliterator 202, a constraints normalizer 204, and a string comparator 206. Such components may be implemented in software executable on one or more hardware processors, in hardware circuitry, or in combinations thereof.

In the process of executing a cross-orthography search, for example, a search engine performing a cross-orthography fuzzy string comparison using the comparison engine 200. In FIG. 2, assume a search query 208 (including the string ""比尔·克林顿"") has been input to the search engine. One or more of the records of the English language database that is to be searched includes a string 210 ("Bill Clinton"). For the purposes of this description, it is assumed that the search query 208 and the string 210 should have a high similarity score from a comparison operation, indicating a strong match. Other string pairings may have higher or lower similarity scores from a comparison operation. As such, the comparison engine is tasked with generating a similarity score 220 for the string pairs, represented by the following function:

Similarity Score=Compare(""比尔·克林顿"", "Bill Clinton").

The described technology implements various combinations of reversed phonological constraints and applied orthographical constraints. In linguistics, such phonological constraints may be consistent with the linguistic model referred to as "Optimality Theory" or "OT," which proposes that observed forms of languages arise from an optimal satisfaction of conflicting linguistic constraints rather than from strict adherence to a set of linguistic rules. As such, OT models grammars as linguistic systems that provide mappings from textual inputs to phonological outputs. It should be understood that the described technology need not be limited to implementations of the OT model and that implementation in the context of other constraint-based models may also be contemplated.

In some implementations, the OT model assumes that such phonological constraints are universal in definition, although they may be ranked differently for different grammars. As such, constraints may be ranked on a per-language basis. For example, two competing OT constraints on the same syllable often only result in the higher ranking constraint being applied. The term "phonological constraints" are considered with associated per-language rankings, and in the OT model, there are two basic types of constraints (faithfulness constraints and markedness constraints). Faithfulness constraints require that the observed surface form (the output) match the underlying or lexical form (the input) in some particular way. As such, faithfulness constraints require identity between input and output forms.

Example faithfulness constraints for a given orthography may include one or more of the following:
  The output must preserve all segments present in the input
  The output must preserve the linear order of segments in the input
  Output segments must have counterparts in the input
  Output segments and input segments must share values for voice Markedness constraints impose requirements on the structural well-formedness of the output. Example markedness constraints for a given orthography may include one or more of the following:
  Any Vowel must not be nasal
  Any Syllable must not have a coda
  Any Obstruent in coda position must not be voiced
  Any Sonorant must be voiced
  Any Syllable must have an onset
  Any Obstruent after a nasal must be voiced In contrast, the term "orthographical constraints" refers to limitations upon the written representation of words in a given orthography. As such, the term "orthographical constraints" refers to restrictions on the way in which letters may be arranged in the written form of a language. For example, "ck" does not occur at the beginnings of English words. While many orthographical constraints exist in various languages, such constraints that affect pronunciation are less common than phonological constraints (when an orthographical constraint has no effect on the transliteration into a phonetic alphabet, it has no cascading effect on subsequent phonetic comparisons). However, if such a misspelling were to occur and the transliteration treated this as the "k" sound, this spelling error would have no more impact on downstream comparison than any other spelling error. Still, there are orthographical constraints that do affect pronunciation. For example, Standard Arabic spells out words and optionally omits low vowels (English also has only two low vowels: IPA:/ɑ/ and IPA:/æ/, as in pot and pat). If either of these vowels were part of the normal pronunciation of an Arabic word, the transliteration process might not include these sounds if not present in the incoming Arabic script text. Normalizing this type of orthographical constraint involves an insertion of the missing low vowel at the proper insertion point after phonetic alignment and detection has occurred.

To implement the search, the comparison engine 200 processes the string of the search query 208 and the strings in the English language database according to the described technology and then executes a fuzzy string comparison to identify matches between the search query 208 and the content of the English language database. Referring to the three phases suggested in FIG. 2 (transliteration, constraints application, and comparison), the first two phases of the comparison operation condition the input data, performing a phonetic transliteration, reversing phonological constraints on the strings from their respective orthographies, and applying orthographical constraints on the strings from their respective orthographies. A comparison phase performs vectorized comparisons at the phoneme level, thus obfuscating away orthographical and phonological noise between languages.

In the first phase, the transliterator 202 receives the search query 208 and the string 210 and transforms both into their respective phonetic spellings, shown as a phonetic spelling 212 and a phonetic spelling 214. In various implementations, the transliterator 202 may use the International Phonetic Alphabet (IPA), ARPAnet, or other systems of phonetic notation, which represent phonemes and/or allophones of one or more languages with distinct sequences of ASCII characters. As shown in FIG. 2, the example transliteration of ""比尔·克林顿"" results in the notation "bi er ke lin dun", and the example transliteration of "Bill Clinton" results in the notation "bɪl klɪn tə n". While these results appear to be somewhat similar, they are different enough to potentially result in a low enough similarity score that the two strings, which are described above as a strong match, are nevertheless identified as a poor match. To address this concern, the described technology improves the accuracy of such similarity scores over this type of transliteration when applied to cross-orthography fuzzy string comparisons. In at least one implementation, the characters of the phonetic spelling 212 and the phonetic spelling 214 are vectorized into feature vectors for each input string before the next phase. The vectorization process deterministically converts a phonetic character into a Boolean array. Each of these Boolean values is called a "feature."

The next phase detects and reverses one or more phonological constraints that have been applied to the phonetic spelling 212 and the phonetic spelling 214 in their respective orthographies. The constraints normalizer 204 reverses phonological constraints based upon detection logic: detected constraints are reversed when detected. First, each language has a tunable parameter (implemented as a detection condition) for a ranking threshold that applies across the language for phonological constraints. Effectively, the satisfaction of the detection condition of a constraint by a string triggers the reversal of the language's phonological constraints on that strong, independent of a ranking threshold for each constraint. In other words, on a per-language basis, the reverse constraints are either triggered or not triggered. (Per-language ranking typically only affects inclusion versus exclusion in the detection logic for that language.) The constraints need not be ranked relative to one another. Instead, the pair of feature vectors of the string drive (and the satisfaction of the detection condition) define whether the constraint should be reversed on that string. The output of the constraints normalizer 204 includes a revised phonetic spelling for each input string.

In some implementations, in addition to reversal of phonological constraints, the constraints normalizer 204 detects and reverses orthographical constraints of both orthographies to both input strings with the goal of further normalizing the two revised phonetic spellings prior to comparison. As will be described in more detail with respect to FIGS. 3 and 4, reversals of orthographical constraints to both input languages are applied to the revised phonetic spellings of both input strings and are incorporated therein.

The constraints normalizer 204, therefore, outputs processed versions of the transliterated (e.g., IPA) forms of the search query 208 and the string 210 from the English language database (i.e., the phonetic spelling 212 and the phonetic spelling 214, respectively). The processed version of the phonetic spelling 212 is depicted as revised phonetic spelling 216 ("birklindun"), and the processed version of the phonetic spelling 214 is depicted as revised phonetic spelling 218 ("bɪlklɪntən"), which even visually appears more similar than the raw phonetic spellings (e.g., the phonetic spelling 212 and the phonetic spelling 214).

The string comparator 206 receives the revised phonetic spelling 216 and the revised phonetic spelling 218 and executes similarity evaluations of the revised phonetic spelling 216 and the revised phonetic spelling 218, such as using a cosine similarity function, although other similarity evaluations may be employed including without limitation a Jaccard similarity function, a Gaussian similarity function and a radial basis function (RBF) kernel. The output of the string comparator 206 includes a similarity score that represents a measure of the similarity between the revised phonetic spelling 216 and the revised phonetic spelling 218. Typically, the similarity score is a value between 0 and 1 or 0 and 100, although other scales may be employed.

It should be understood from even a casual review of the phonetic spellings 212 and 214, as compared to the revised phonetic spelling 216 and 218, that the revised phonetic spellings appear more similar than the phonetic spellings. Reversal of phonological constraints and orthographical constraints on the phonetic spellings obfuscate away orthographical and phonological noise between the individual languages, resulting in a more accurate similarity score than would typically be obtained from the phonetic spellings 212 and 214 alone.

Figure 3:
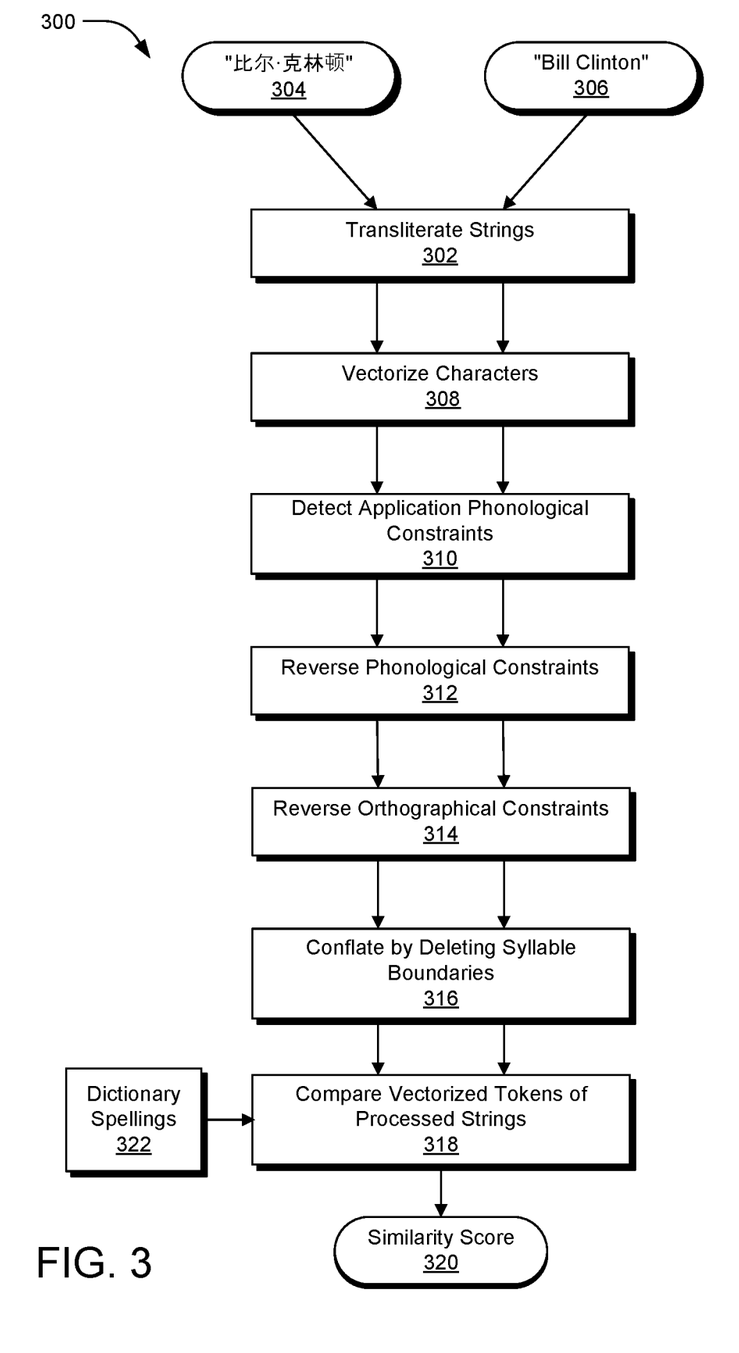
FIG. 3 illustrates example operations for cross-orthography fuzzy string comparison.

FIG. 3 illustrates operations 300 of an example cross-orthography fuzzy string comparison engine. The described technology is concerned with one or more linguistic concepts, including without limitation phonetic features, phonological constraints, and orthographical constraints, including the ranking of constraints on a per-language basis. The technology also recognizes the benefit of faithfulness constraints by providing two faithfulness constraint scores, which provide a more accurate transliteration result than prior approaches:

The first score uses all constraint detection and reversal logic, obfuscating away all the noise induced by constraints The other score [faithfulness] compares unrevised phonetic spellings Additionally, in some applications, orthographical constraints of each orthography are detected and reversed in each input string. Typically, the reversal of orthographical constraints is performed after the reversal of phonological constraints, although other implementations may reverse or intersperse these reversals.

In one implementation, the linguistic concepts are implemented using functions executed in a predefined sequence to process the strings prior to comparison, although other implementations may change the ordering in some manner. A comparator( ) function is used for dependency injection, allowing for customization of how character-level feature vectors are deemed similar. In one implementation, a hash map is used in a vectorizing operation to convert characters into feature vectors representing each string, although other methods may be employed.

Example functions are provided below in the context of the operations 300 for use in at least one implementation of the described technology. It should be understood, however, that different functions may be employed within the scope of the claims.

A transliteration operation 302 receives the string 304 (""比尔·克林顿"") and the string 306 ("Bill Clinton") and transforms them into phonetic spellings, such as into IPA form. The function description provided below describes example functionality capable of performing this operation.

Function: TextToIPA(text, lang): This function converts any supported language/orthography into IPA (although other language models may be employed). If the language parameter "lang" is not supplied, the language may be automatically detected based upon the orthography and/or the actual text. In some implementations, beyond transliteration into IPA, this function marks boundaries between syllables, which may be used when reversing phonological constraints. Marking syllable boundaries is also called "segmenting," as syllables are sometimes known as segments.

A vectorizing operation 308 (e.g., performed by a vectorizer, not shown) receives the phonetic spellings output from the transliteration operation 302 and converts each character of the phonetic spellings into a vector in a vector space. The function description provided below describes example functionality capable of performing this operation.

Function: Vectorizeipa: This function employs a hash map that takes an IPA character as input and vectorizes it into an unsigned integer representation of the character with 64 bits. Each bit is treated as a dimension in the vector, providing 64 dimensions of features per character (e.g., each dimension is a single bit: zero or one). Alternative vectorizing functions may be employed.

A detection operation 310 executes detection logic that detects whether a phonological constraint has been applied to each string in its original orthography. The detection operation 310 evaluates feature vectors (corresponding to individual characters in the transliterated strings) to determine whether individual phonemes, syllables, and other linguistic aspects of the phonetic spelling satisfy one or more detection logic conditions (e.g., such as those example detection logic conditions shown in the middle column of the table below). If so, the detection operation 310 determines that a phonological constraint had been applied within the string, word, or syllable, and a reversal operation 312 reverses the application of the phonological constraint in the transliterated string (e.g., a phonetic spelling), such as applying the action listed in the rightmost column of the table below.

Table 1 provides a detection logic/reversal mapping for six example constraints:

TABLE 1

Example Phonological Constraints

| Constraint | Detection Logic Condition | Reversal of constraint |
|---|---|---|
| 1. Any vowel: not be nasal | A vowel is unmarked for nasal feature | Mark the vowel with the nasal feature. |
| 2. Any syllable: no coda | Vowel has been appended after coda | Remove extraneous vowel |
| 3. Any obstruent in coda position: no voice | Syllable ending with an obstruent [a type of consonant] and has no voice | Mark obstruent for voice |
| 4. Any sonorant: has voice | Sonorant [all vowels and some consonants] has voice. | Unmark sonorant for voice |
| 5. Any syllable: has onset | Syllable with no onset has onset inserted | Remove extraneous consonant |
| 6. Any Obstruent after a nasal: has voice | The pattern of nasal + obstruent will invoke voice on the obstruent | Unmark obstruent for voice |

Table 1 above uses known linguistics terminology, such as coda, obstruent, sonorant, onset, and voice, which are further described as follows. The coda is defined as a final consonant phoneme of a syllable (e.g., /L/ is the consonant phoneme in the single-syllable word "Bill"). Syllables that do not end with a consonant sound have no coda. Many languages, such as Chinese, forbid a coda on most syllables. Other languages, such as English, generate a liberal application of codas on most words in any syllable. This impedance mismatch is what motivates phonological constraint reversal in the constraint normalization process. In effect, phonological constraint reversal eliminates comparison noise induced by language-specific phonological constraints.

An obstruent is a speech sound such as [k], [d͡ʒ], or [f] that is formed by obstructing airflow. Obstruents contrast with sonorants, which have no such obstruction and so resonate. All obstruents are consonants, but sonorants include vowels as well as consonants. In phonetics and phonology, a sonorant or resonant is a speech sound that is produced with continuous, non-turbulent airflow in the vocal tract; these are the manners of articulation that are most often voiced in the world's languages. Vowels are sonorants, as are nasals like [m] and [n], liquids like [l] and [r], and semivowels like [j] and [w]. This set of sounds contrasts with the obstruents (stops, affricates, and fricatives).

The onset is defined as a initial consonant phoneme of a syllable (e.g.,/B/is the consonant phoneme in the single-syllable word "Bill"). Syllables that do not begin with a consonant sound have no onset or have a zero onset. Most syllables of most languages have an onset. Syllables without an onset may be said to have a zero onset. Voice is a feature that indicates whether the vocal cords are vibrating or not. When the vocal cords are vibrating, a phoneme is said to have voice. Otherwise, it is said to have no voice (e.g.,/v/ and/f/phonemes differ only by voice./v/has voice./f/has no voice).

The function described below provides an example implementation that performs both the detection operation 310 and the reversal operation 312, although they may be implemented in two or more different functions in other designs. In some implementations, the ReversePhonologicalConstraints function and/or the ReverseOrthographicalConstraints function are implemented in a constraints normalizer, although other allocations of these functions may be employed.

Function: ReversePhonologicalConstraints(ipa1, lang1, ipa2, lang2): Feature vectors of ipa1 and ipa2 are generated (or alternatively, passed in to the function). Phonological constraints of a source language are applied (and dimensions are updated) to feature vectors of the input strings. With respect to certain phonological constraints, for example, an IPA character (representing a phoneme) can be inserted or deleted from the array of feature vectors to reverse a phonological constraint. Since OT-based phonological constraints are defined as characteristics that are constrained to happen within the orthography, the reversal operation recasts each of these phonological constraints as a detectable effect that can be reversed.

For example, referring to Table 1, if a feature vector representing a vowel in the input string does not include an IPA character representing a nasal sound (as determined by the detection operation 310 that executes the detection logic in the first substantive row of Table 1, then the reversal operation 312 executes the reversal action described in the last column of that row (e.g., adding an IPA character representing a nasal sound to the vowel). In another example, referring again to Table 1, if a syllable of a feature vector with no onset has an IPA onset character Inserted (as determined by the detection operation 310 that executes the detection logic in the fifth substantive row of Table 1, then the reversal operation 312 executes the reversal action described in the last column of that row (e.g., removing the IPA onset character from the syllable).

As such, the detection operation 310 and the reversal operation 312 evaluates and process elements of the input string based on detection logic and reversal instructions, respectively. In other implementations, the detection operation 310 may also detect orthographical constraints, which are reversed in another reversal operation 314.

In addition to reversing phonological constraints in an input string, in some implementations, the reversal operation 314 reverses orthographical constraints of both orthographies to the input string. Again, orthographical constraints refer to restrictions on the way in which letters may be arranged in the written form of a language. For example, "ck" does not occur at the beginnings of English words. Accordingly, if "ck" is detected at the beginning of the phonetic spelling of an input string, the application operation 314 replaces the "ck" with a IPA:/k/. In one implementation, the detection logic for the reversal of orthographical constraints is included in the reversal operation 314, although other implementations may remove the detection logic into a separate operation.

Function: ReverseOrthographicalConstraints(ipa, lang1, lang2): Orthographical constraints of the source languages lang1 and lang2 are detected and reversed (and the features are updated) to feature vectors of the phonetic spelling ipa. For example, one known orthographical constraint is unique to the Arabic language in written form: short vowels are implied between consonants but not written. This constraint implies that all short vowels might be absent from text that originated as an Arabic string. Orthographical constraints for both languages are reversed in the phonetic spellings of both input strings. As such, if one of the input strings is in Arabic, the reversal operation 314 adds short vowels between consonants using the other comparison string as a guide to determine the specific low vowel to be inserted. Additional orthographical constraints of the source languages lang1 and lang2 can also be reversed in the phonetic spellings of each input string. In one implementation, the reversal of orthographical constraints is executed after the reversal of phonological constraints, although other implementations may adjust the order according to design preferences.

Function: Conflate(ipa): A conflation operation 316 (e.g., performed by a conflator, not shown) deletes all syllable markers (e.g., IPA syllable boundary markers) to conflate the segments of the phonetic spellings of each input string.

After the processing of the phonetic spellings of each input string, including one or more of transliteration, vectorization, phonological constraint detection, phonological constraint reversal, orthographical constraint reversal, and conflation, the resulting feature vectors of characters in the revised phonetic spellings of the input strings are pair-wise compared to generate a similarity score 320 for the input string pair, such as by executing the example Compare( ) function below.

Function: Compare(ipa1, ipa2, comparator): After vectorizing each IPA character of each revised phonetic spelling into a feature-vector, a comparison operation 318 (implemented in one example by a Compare( ) function) perform per-character similarity calculation using the comparator( ) function passed in as a parameter. Dictionary spellings 322 are input to the comparison operation 318 as an input to the similarity function (e.g., a cosine similarity function, a Jaccard similarity function).

In one implementation, 64 dimensions are sufficient to represent phonological markedness and other phonological features, although other dimensions are also contemplated, such as 128 dimensions. Each character is compared for similarity using its relative position within the other string. Notwithstanding, characters themselves are not strictly compared in at least one implementation. Instead, the feature vectors that represent the two characters within each IPA string are compared via the comparator function.

In short, the comparison operation 318 performs a similarity function on each IPA character using the character's corresponding feature vector in the other comparison string and generates a similarity score for each feature vector. The scores are summed for all feature vectors. The resulting similarity score returned by Compare( ) function is the summation divided by the number of candidate feature vectors. The character comparator itself is specified in an input parameter to the Compare( ) function. Per-character feature-vectors can be deemed similar when the comparison operation 318 deems them to be similar. An example comparator function is cosine similarity, defined as:

$$\text{similarity}(A, B) = \frac{A \cdot B}{\|A\| \times \|B\|} = \frac{\sum_{i=1}^{n} A_i \times B_i}{\sqrt{\sum_{i=1}^{n} A_i^2} \times \sqrt{\sum_{i=1}^{n} B_i^2}}$$

By utilizing an integer to represent a vector, the described technology streamlines processing overhead, obviating the need for actual arrays and thus minimizing object instantiations. This compact representation is designed to optimize performance in some implementations.

In one implementation, each invocation of a comparator function returns two scores:

Phonetic faithfulness scores with relaxation neither upon phonological constraints nor upon orthographical constraints (0 to 10000)

Constraint-relaxation score (0 to 10000)

There are two levels of comparison in both scores:

character granularity: cosine similarity (−1.0<=similarity<=1.0)// or Jaccard, or other // normalized to 0-10000 string_granularity: scoring is a roll-up of character similarity // average of all character scores aligned via MPS The comparison operation 318 provides a comparison score that indicates similarity between two phonemes. A phoneme is represented initially as IPA (International Phonetic Alphabet) and later as a feature vector represented as an array of bits. For the sake of compactness and performance, in one implementation, each feature vector is represented as an unsigned integer (here, the number of bits that compose the unsigned integer indicates the number of dimensions in the feature vector. As 128-bit integers are supported on modern computing systems, the number of dimensions supported in a 64-bit unsigned integer is adequate to represent as many features as will be required to represent individual phonemes). The comparison scores for each phoneme pair are summed to yield the similarity score 320 for the two input strings.

Cosine Similarity, Jaccard Similarity, or a custom comparator is passed as a function parameter to the Compare( ) function using a dependency injection pattern. Any similarity method can be utilized.

Pseudo-code for implementing an example comparison operation 318 is provided below, although it should be understood that alternative logic may be employed. Also, featureVector variables and variables of the form similar to elv and clv are arrays of vectors that store the per-character feature vectors corresponding to each string. For example, in one implementation, each character is converted into an integer that represents up to 64 dimensions, although greater or fewer dimensions may be represented in other implementations.

```
function CosineSimilarity(featureVector1, featureVector2): uint16:
    if featureVector1 = 0:
        return 0
    if featureVector2 = 0:
        return 0
    if featureVector1 = featureVector2:
        return 10000
    var c = cosine(featureVector1, featureVector2)        # value between −1.0 and 1.0
    if c <= 0.0:
        return 0
    return c * 10000        # normalize value into an integer between 0 and 10,000
function Jaccard(featureVector1, featureVector2): uint16:
    if featureVector1 =0
        return 0
    if featureVector2 = 0
        return 0
```

-continued

```
    if featureVector1 = featureVector2
        return 10000
    var size1 = sizeof(featureVector1)
    var size2 = sizeof(featureVector2)
    var size = Max(size1, size2)
    bit = 1
    both = 0
    either = 0
    for position = 1 to size:
        found = false
        if (position <= size1) and (bit & featureVector1 = bit):
            found = true
        if (position <= size2) and (bit & featureVector2 = bit):
            if found = true:
                both = both + 1
            found = true
        if found = true:
            either = either + 1
        bit = bit << 1 # left-shift the bit
    return (10000 * both) / either; # normalize value into an integer between 0 and 10,000
```

An example implementation of a transliterator (Phase 1) on the two strings "Bill Clinton" and ""比尔·克林顿"" to IPA may be described as follows, where the feature vectors of the two strings are indicated as "elv" and "clv":

Transliterate in IPA—Phase I:
e="Bill Clinton"
c=""比尔·克林顿""
e1=TextToIPA(e, "en") #e1=[bil klm tə n] #language code for English="en"
elv: [20000D80, 24D, 4020380, 0, 400080, 4020380, 24D, 4001380, 0, 4000080, 22F, 4001380] (hex)
c1=TextToIPA(c, "zh") #c1=[bi er ke lin dun] #language code for Chinese="zh" #clv: [20000D80, 249, 0, 24D, 4002180, 0, 400080, 24D, 0, 4020380, 249, 4001380, 0, 4000D80, 219, 4001380] (hex)

An example implementation of the detection operation 310, the reversal operation 312, and the reversal operation 314 can be described by the functions calls below (wherein the detection operation 310 and the reversal operation 312 are both included in the ReversePhonologicalConstraints( ) function):

Adjust for Language-Specific Linguistic Constraints—Phase II:
e2=ReversePhonologicalContraints(e1, "en", c1, "zh")
e2=[bɪl klɪm tə n] ##no change
e2v: [20000D80, 24D, 4020380, 0, 400080, 4020380, 24D, 4001380, 0, 4000080, 22F, 4001380]
e3=ReverseOrthographicalConstraints(e2, "en", "zh")
e2=[bil klm tə n] ##no change
e3v: [20000D80, 24D, 4020380, 0, 400080, 4020380, 24D, 4001380, 0, 4000080, 22F, 4001380]
c2=ReversePhonologicalContraints(c1, "zh", e2, "en")
c2=[bi r e lin dun]
c2v: [20000D80, 249, 0, 4002180, 0, 400080, 0, 4020380, 249, 4001380, 0, 4000D80, 219, 4001380]
c3=ReverseOrthographicalConstraints(c2, "zh", "en")
c3=[bi r e lin dun] ##no change
c3v: [20000D80, 249, 0, 4002180, 0, 400080, 0, 4020380, 249, 4001380, 0, 4000D80, 219, 4001380] #no change An example implementation of the conflation operation 316 and the comparison operation 318 can be described by the function calls below:

Conflations & Comparisons—Phase III:
e4=Conflate(e3) #e4=[bɪlklɪntə n]
c4=Conflate(c3) #c4=[birelindun]
score=Compare(e5, c5, Jaccard)
e5=Conflate(e1) #e1=[bɪl klɪn tə n]
c5=Conflate(c1) #c2=[bi er ke lin dun]
faithfulnessScore=Compare(e5, c5, Jaccard)

Figure 4:
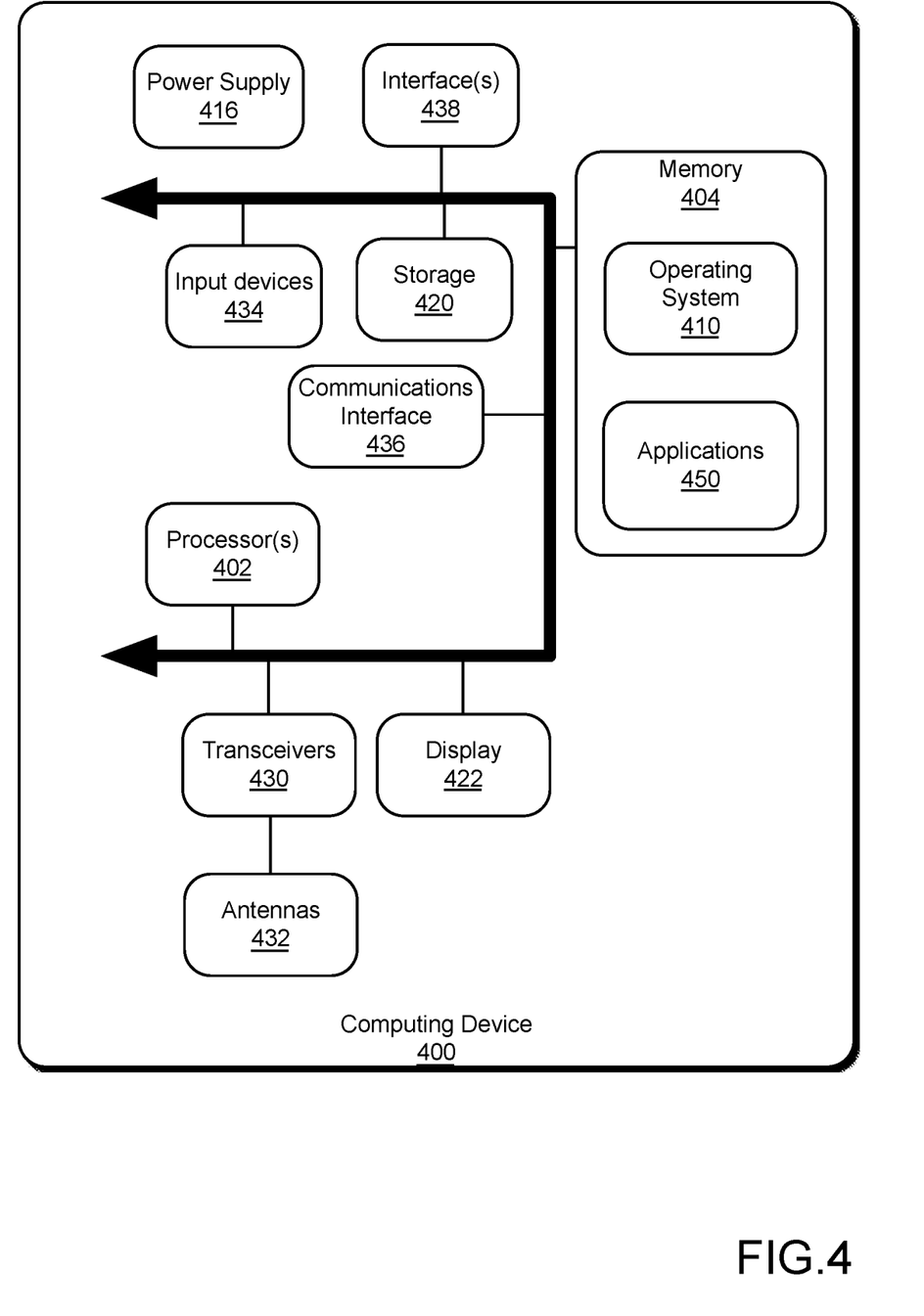
FIG. 4 illustrates an example computing device for use in cross-orthography fuzzy string comparison.

FIG. 4 illustrates an example computing device for use in cross-orthography fuzzy string comparison. The computing device 400 may be a client device, such as a laptop, mobile device, desktop, tablet, or a server/cloud device. The computing device 400 includes one or more processor(s) 402, and a memory 404. The memory 404 generally includes both volatile memory (e.g., RAM) and nonvolatile memory (e.g., flash memory). An operating system 410 resides in the memory 404 and is executed by the processor(s) 402.

In an example computing device 400, as shown in FIG. 4, one or more modules or segments, such as applications 450, a transliterator, a constraints normalizer, a string comparator, and other modules are loaded into the operating system 410 on the memory 404 and/or storage 420 and executed by processor(s) 402. The storage 420 may store strings, feature vectors, dictionary strings, per-character comparison scores, per-string similarity scores, and other data and be local to the computing device 400 or may be remote and communicatively connected to the computing device 400. In one implementation, a transliterator, a constraints normalizer, a string comparator, and other modules may include circuitry to perform intended functions. In particular, in one implementation, components of the cross-orthography fuzzy string comparison engine may be implemented entirely in hardware or in a combination of hardware circuitry and software.

The computing device 400 includes a power supply 416, which is powered by one or more batteries or other power sources, and which provides power to other components of the computing device 400. The power supply 416 may also be connected to an external power source that overrides or recharges the built-in batteries or other power sources.

The computing device 400 may include one or more communication transceivers 430, which may be connected to one or more antenna(s) 432 to provide network connectivity (e.g., mobile phone network, Wi-Fi®, Bluetooth®) to one or more other servers and/or client devices (e.g., mobile devices, desktop computers, or laptop computers). The computing device 400 may further include a network adapter 436, which is a type of communication device. The computing device 400 may use the adapter and any other types of communication devices for establishing connections over a wide-area network (WAN) or local-area network (LAN). It should be appreciated that the network connections shown are exemplary and that other communications devices and means for establishing a communications link between the computing device 400 and other devices may be used.

The computing device 400 may include one or more input devices 434 such that a user may enter commands and information (e.g., a keyboard or mouse). These and other input devices may be coupled to the server by one or more interfaces 438, such as a serial port interface, parallel port, or universal serial bus (USB). The computing device 400 may further include a display 422, such as a touch screen display.

The computing device 400 may include a variety of tangible processor-readable storage media and intangible processor-readable communication signals. Tangible processor-readable storage can be embodied by any available media that can be accessed by the computing device 400 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 400. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example method of fuzzy string comparison between a first textual string of a first orthography and a second textual string of a second orthography is provided. The method includes transliterating the first textual string to a first phonetic spelling and the second textual string to a second phonetic spelling, detecting application of one or more constraints of the first orthography on the first phonetic spelling and of one or more constraints of the second orthography on the second phonetic spelling, reversing the detected constraints of the first orthography on the first phonetic spelling to generate a first revised phonetic spelling and the detected constraints of the second orthography on the second phonetic spelling to generate a second revised phonetic spelling, and comparing the first revised phonetic spelling and the second revised phonetic spelling to generate a similarity score for the first textual string and the second textual string.

Another example method of any preceding method is provided, further including vectorizing the first phonetic spelling and the second phonetic spelling, wherein the reversing operation and the comparing operation are performed on vectorized forms of the first phonetic spelling and the second phonetic spelling.

Another example method of any preceding method is provided, wherein the reversing operation includes reversing one or more phonological constraints of the first orthography on the first revised phonetic spelling and one or more phonological constraints of the second orthography on the second revised phonetic spelling, wherein the comparing operation is performed on the first revised phonetic spelling and the second revised phonetic spelling after the reversal of the one or more phonological constraints.

Another example method of any preceding method is provided, wherein the reversing operation includes reversing one or more orthographical constraints of the first orthography on the first revised phonetic spelling and one or more orthographical constraints of the second orthography on the second revised phonetic spelling, wherein the comparing operation is performed on the first revised phonetic spelling and the second revised phonetic spelling after the reversal of the one or more orthographical constraints.

Another example method of any preceding method is provided, further including deleting one or more syllable boundaries in the first revised phonetic spelling and the second revised phonetic spelling, wherein the comparing operation is performed on the first revised phonetic spelling and the second revised phonetic spelling after deletion of one or more syllable boundaries.

Another example method of any preceding method is provided, wherein the comparing operation includes executing a similarity function between the first revised phonetic spelling and the second revised phonetic spelling, wherein the similarity function is pair-wise executed on each feature vector corresponding to each character of the first revised phonetic spelling and the second revised phonetic spelling to generate per-character output scores.

Another example method of any preceding method is provided, wherein the first textual string is a search query and the second textual string is included in data to be searched, and further including outputting a ranked listing of the data to be searched based on the similarity score for the first textual string and the second textual string and other similarity scores between the first textual string and other strings in the data to be searched.

An example system for fuzzy string comparison between a first textual string of a first orthography and a second textual string of a second orthography is provided. The system includes one or more hardware processors, a transliterator executable by the one or more hardware processors and configured to transliterate the first textual string to a first phonetic spelling and the second textual string to a second phonetic spelling, a constraints normalizer executable by the one or more hardware processors and configured to detect application of one or more constraints of the first orthography on the first phonetic spelling and of one or more constraints of the second orthography on the second phonetic spelling and to reverse the detected constraints of the first orthography on the first phonetic spelling to generate a first revised phonetic spelling and the detected constraints of the second orthography on the second phonetic spelling to generate a second revised phonetic spelling, and a string comparator executable by the one or more hardware processors and configured to compare the first revised phonetic spelling and the second revised phonetic spelling to generate a similarity score for the first textual string and the second textual string.

Another example system of any preceding system is provided, further including a vectorizer executable by the one or more hardware processors and configured to vectorize the first phonetic spelling and the second phonetic spelling, wherein the reversing operation and the comparing operation are performed on vectorized forms of the first phonetic spelling and the second phonetic spelling.

Another example system of any preceding system is provided, wherein the constraints normalizer is configured to reverse one or more phonological constraints of the first orthography on the first revised phonetic spelling and one or more phonological constraints of the second orthography on the second revised phonetic spelling, wherein the comparing operation is performed on the first revised phonetic spelling and the second revised phonetic spelling after application of the one or more phonological constraints.

Another example system of any preceding system is provided, wherein the constraints normalizer is configured to reverse one or more orthographical constraints of the first orthography on the first revised phonetic spelling and one or more orthographical constraints of the second orthography on the second revised phonetic spelling, wherein the comparing operation is performed on the first revised phonetic spelling and the second revised phonetic spelling after application of the one or more orthographical constraints.

Another example system of any preceding system is provided, further including a conflator executable by the one or more hardware processors and configured to delete one or more syllable boundaries in the first revised phonetic spelling and the second revised phonetic spelling, wherein the comparing operation is performed on the first revised phonetic spelling and the second revised phonetic spelling after deletion of one or more syllable boundaries.

Another example system of any preceding system is provided, wherein the string comparator is configured to execute a similarity function between the first revised phonetic spelling and the second revised phonetic spelling, wherein the similarity function is pair-wise executed on each feature vector corresponding to each character of the first revised phonetic spelling and the second revised phonetic spelling to generate per-character output scores.

Another example system of any preceding system is provided, wherein the first textual string is a search query and the second textual string is included in data to be searched, and the string comparator is further configured to output a ranked listing of the data to be searched based on the similarity score for the first textual string and the second textual string and other similarity scores between the first textual string and other strings in the data to be searched.

One or more example tangible processor-readable storage media embodied with instructions for executing on one or more processors and circuits of a computing device a process for fuzzy string comparison between a first textual string of a first orthography and a second textual string of a second orthography are provided. The process includes transliterating the first textual string to a first phonetic spelling and the second textual string to a second phonetic spelling, detecting application of one or more constraints of the first orthography on the first phonetic spelling and of one or more constraints of the second orthography on the second phonetic spelling, reversing the detected constraints of the first orthography on the first phonetic spelling to generate a first revised phonetic spelling and the detected constraints of the second orthography on the second phonetic spelling to generate a second revised phonetic spelling, and comparing the first revised phonetic spelling and the second revised phonetic spelling to generate a similarity score for the first textual string and the second textual string.

One or more other example tangible processor-readable storage media of any preceding media are provided, wherein the process further includes reversing one or more orthographical or phonological constraints of the first orthography on the first revised phonetic spelling and one or more orthographical or phonological constraints of the second orthography on the second revised phonetic spelling, wherein the comparing operation is performed on the first revised phonetic spelling and the second revised phonetic spelling after the application of the one or more orthographical or phonological constraints.

One or more other example tangible processor-readable storage media of any preceding media are provided, wherein the process further includes deleting one or more syllable boundaries in the first revised phonetic spelling and the second revised phonetic spelling, wherein the comparing operation is performed on the first revised phonetic spelling and the second revised phonetic spelling after deletion of one or more syllable boundaries.

One or more other example tangible processor-readable storage media of any preceding media are provided, wherein the comparing operation includes executing a similarity function between the first revised phonetic spelling and the second revised phonetic spelling, wherein the similarity function is pair-wise executed on each feature vector corresponding to each character of the first revised phonetic spelling and the second revised phonetic spelling to generate per-character output scores.

One or more other example tangible processor-readable storage media of any preceding media are provided, wherein the comparing operation further includes summing the per-character output scores from the similarity function to yield the similarity score for the first textual string and the second textual string.

One or more other example tangible processor-readable storage media of any preceding media are provided, wherein the first textual string is a search query and the second textual string is included in data to be searched, and further including outputting a ranked listing of the data to be searched based on the similarity score for the first textual string and the second textual string and other similarity scores between the first textual string and other strings in the data to be searched.

Another example system for fuzzy string comparison between a first textual string of a first orthography and a second textual string of a second orthography is provided. The system includes means for transliterating the first textual string to a first phonetic spelling and the second textual string to a second phonetic spelling, means for detecting application of one or more constraints of the first orthography on the first phonetic spelling and of one or more constraints of the second orthography on the second phonetic spelling, means for reversing the detected constraints of the first orthography on the first phonetic spelling to generate a first revised phonetic spelling and the detected constraints of the second orthography on the second phonetic spelling to generate a second revised phonetic spelling, and means for comparing the first revised phonetic spelling and the second revised phonetic spelling to generate a similarity score for the first textual string and the second textual string.

Another example system of any preceding system is provided, further including means for vectorizing the first phonetic spelling and the second phonetic spelling, wherein the means for reversing and the means for comparing operate on vectorized forms of the first phonetic spelling and the second phonetic spelling.

Another example system of any preceding system is provided, wherein the means for reversing includes means for reversing one or more phonological constraints of the first orthography on the first revised phonetic spelling and one or more phonological constraints of the second orthography on the second revised phonetic spelling, wherein the means for comparing operates on the first revised phonetic spelling and the second revised phonetic spelling after the reversal of the one or more phonological constraints.

Another example system of any preceding system is provided, wherein the means for reversing includes means for reversing one or more orthographical constraints of the first orthography on the first revised phonetic spelling and one or more orthographical constraints of the second orthography on the second revised phonetic spelling, wherein the means for comparing operates on the first revised phonetic spelling and the second revised phonetic spelling after the reversal of the one or more orthographical constraints.

Another example system of any preceding system is provided, further including means for deleting one or more syllable boundaries in the first revised phonetic spelling and the second revised phonetic spelling, wherein the means for comparing operates on the first revised phonetic spelling and the second revised phonetic spelling after deletion of one or more syllable boundaries.

Another example system of any preceding system is provided, wherein the means for comparing includes means for executing a similarity function between the first revised phonetic spelling and the second revised phonetic spelling, wherein the similarity function is pair-wise executed on each feature vector corresponding to each character of the first revised phonetic spelling and the second revised phonetic spelling to generate per-character output scores.

Another example system of any preceding system is provided, wherein the first textual string is a search query and the second textual string is included in data to be searched, and further including means for outputting a ranked listing of the data to be searched based on the similarity score for the first textual string and the second textual string and other similarity scores between the first textual string and other strings in the data to be searched.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of fuzzy string comparison between a first textual string of a first orthography and a second textual string of a second orthography, the method comprising:
   transliterating the first textual string to a first phonetic spelling and the second textual string to a second phonetic spelling;
   detecting application of one or more constraints of the first orthography on the first phonetic spelling and of one or more constraints of the second orthography on the second phonetic spelling;
   reversing the detected constraints of the first orthography on the first phonetic spelling to generate a first revised phonetic spelling and the detected constraints of the second orthography on the second phonetic spelling to generate a second revised phonetic spelling; and
   comparing the first revised phonetic spelling and the second revised phonetic spelling to generate a similarity score for the first textual string and the second textual string.

2. The method of claim 1, further comprising:
   vectorizing the first phonetic spelling and the second phonetic spelling, wherein the reversing operation and the comparing operation are performed on vectorized forms of the first phonetic spelling and the second phonetic spelling.

3. The method of claim 1, wherein the reversing operation comprises:
   reversing one or more phonological constraints of the first orthography on the first revised phonetic spelling and one or more phonological constraints of the second orthography on the second revised phonetic spelling, wherein the comparing operation is performed on the first revised phonetic spelling and the second revised phonetic spelling after the reversal of the one or more phonological constraints.

4. The method of claim 1, wherein the reversing operation comprises:
   reversing one or more orthographical constraints of the first orthography on the first revised phonetic spelling and one or more orthographical constraints of the second orthography on the second revised phonetic spelling, wherein the comparing operation is performed on the first revised phonetic spelling and the second revised phonetic spelling after the reversal of the one or more orthographical constraints.

5. The method of claim 1, further comprising:
deleting one or more syllable boundaries in the first revised phonetic spelling and the second revised phonetic spelling, wherein the comparing operation is performed on the first revised phonetic spelling and the second revised phonetic spelling after deletion of one or more syllable boundaries.

6. The method of claim 1, wherein the comparing operation comprises:
executing a similarity function between the first revised phonetic spelling and the second revised phonetic spelling, wherein the similarity function is pair-wise executed on each feature vector corresponding to each character of the first revised phonetic spelling and the second revised phonetic spelling to generate per-character output scores.

7. The method of claim 1, wherein the first textual string is a search query and the second textual string is included in data to be searched, and further comprising:
outputting a ranked listing of the data to be searched based on the similarity score for the first textual string and the second textual string and other similarity scores between the first textual string and other strings in the data to be searched.

8. A system for fuzzy string comparison between a first textual string of a first orthography and a second textual string of a second orthography, the system comprising:
one or more hardware processors;
a transliterator executable by the one or more hardware processors and configured to transliterate the first textual string to a first phonetic spelling and the second textual string to a second phonetic spelling;
a constraints normalizer executable by the one or more hardware processors and configured to detect application of one or more constraints of the first orthography on the first phonetic spelling and of one or more constraints of the second orthography on the second phonetic spelling and to reverse the detected constraints of the first orthography on the first phonetic spelling to generate a first revised phonetic spelling and the detected constraints of the second orthography on the second phonetic spelling to generate a second revised phonetic spelling; and
a string comparator executable by the one or more hardware processors and configured to compare the first revised phonetic spelling and the second revised phonetic spelling to generate a similarity score for the first textual string and the second textual string.

9. The system of claim 8, further comprising:
a vectorizer executable by the one or more hardware processors and configured to vectorize the first phonetic spelling and the second phonetic spelling, wherein the reversing operation and the comparing operation are performed on vectorized forms of the first phonetic spelling and the second phonetic spelling.

10. The system of claim 8, wherein the constraints normalizer is configured to reverse one or more phonological constraints of the first orthography on the first revised phonetic spelling and one or more phonological constraints of the second orthography on the second revised phonetic spelling, wherein the comparing operation is performed on the first revised phonetic spelling and the second revised phonetic spelling after application of the one or more phonological constraints.

11. The system of claim 8, wherein the constraints normalizer is configured to reverse one or more orthographical constraints of the first orthography on the first revised phonetic spelling and one or more orthographical constraints of the second orthography on the second revised phonetic spelling, wherein the comparing operation is performed on the first revised phonetic spelling and the second revised phonetic spelling after application of the one or more orthographical constraints.

12. The system of claim 8, further comprising:
a conflator executable by the one or more hardware processors and configured to delete one or more syllable boundaries in the first revised phonetic spelling and the second revised phonetic spelling, wherein the comparing operation is performed on the first revised phonetic spelling and the second revised phonetic spelling after deletion of one or more syllable boundaries.

13. The system of claim 8, wherein the string comparator is configured to execute a similarity function between the first revised phonetic spelling and the second revised phonetic spelling, wherein the similarity function is pair-wise executed on each feature vector corresponding to each character of the first revised phonetic spelling and the second revised phonetic spelling to generate per-character output scores.

14. The system of claim 8, wherein the first textual string is a search query and the second textual string is included in data to be searched, and the string comparator is further configured to output a ranked listing of the data to be searched based on the similarity score for the first textual string and the second textual string and other similarity scores between the first textual string and other strings in the data to be searched.

15. One or more tangible processor-readable storage media embodied with instructions for executing on one or more processors and circuits of a computing device a process for fuzzy string comparison between a first textual string of a first orthography and a second textual string of a second orthography, the process comprising:
transliterating the first textual string to a first phonetic spelling and the second textual string to a second phonetic spelling;
detecting application of one or more constraints of the first orthography on the first phonetic spelling and of one or more constraints of the second orthography on the second phonetic spelling;
reversing the detected constraints of the first orthography on the first phonetic spelling to generate a first revised phonetic spelling and the detected constraints of the second orthography on the second phonetic spelling to generate a second revised phonetic spelling; and
comparing the first revised phonetic spelling and the second revised phonetic spelling to generate a similarity score for the first textual string and the second textual string.

16. The one or more tangible processor-readable storage media of claim 15, wherein the process further comprises:
reversing one or more orthographical or phonological constraints of the first orthography on the first revised phonetic spelling and one or more orthographical or phonological constraints of the second orthography on the second revised phonetic spelling, wherein the comparing operation is performed on the first revised phonetic spelling and the second revised phonetic spelling after the application of the one or more orthographical or phonological constraints.

17. The one or more tangible processor-readable storage media of claim 15, wherein the process further comprises:
deleting one or more syllable boundaries in the first revised phonetic spelling and the second revised phonetic spelling, wherein the comparing operation is performed on the first revised phonetic spelling and the second revised phonetic spelling after deletion of one or more syllable boundaries.

18. The one or more tangible processor-readable storage media of claim 15, wherein the comparing operation comprises:
executing a similarity function between the first revised phonetic spelling and the second revised phonetic spelling, wherein the similarity function is pair-wise executed on each feature vector corresponding to each character of the first revised phonetic spelling and the second revised phonetic spelling to generate per-character output scores.

19. The one or more tangible processor-readable storage media of claim 18, wherein the comparing operation further comprises:
summing the per-character output scores from the similarity function to yield the similarity score for the first textual string and the second textual string.

20. The one or more tangible processor-readable storage media of claim 15, wherein the first textual string is a search query and the second textual string is included in data to be searched, and further comprising:
outputting a ranked listing of the data to be searched based on the similarity score for the first textual string and the second textual string and other similarity scores between the first textual string and other strings in the data to be searched.

* * * * *